United States Patent [19]

Achelpohl

[11] Patent Number: 4,490,207

[45] Date of Patent: Dec. 25, 1984

[54] TRANSVERSE SEVERING APPARATUS FOR WEBS

[75] Inventor: Fritz Achelpohl, Lengerich, Fed. Rep. of Germany

[73] Assignee: Windmoller & Holscher, Lengerich, Fed. Rep. of Germany

[21] Appl. No.: 460,625

[22] Filed: Jan. 24, 1983

[30] Foreign Application Priority Data

Jan. 25, 1982 [DE] Fed. Rep. of Germany ....... 3202272
Feb. 10, 1982 [DE] Fed. Rep. of Germany ....... 3204492

[51] Int. Cl.[3] .............................................. B32B 31/18

[52] U.S. Cl. .................................... 156/494; 156/251; 156/515; 493/203; 493/204

[58] Field of Search ............... 156/229, 251, 494, 515, 156/517; 493/203, 204

[56] References Cited

U.S. PATENT DOCUMENTS 3,384,528 5/1968 Lehmacher et al. ................ 156/515
3,868,290 2/1975 Lagain ................................ 156/515
3,992,981 11/1976 Stock .................................. 156/515
4,268,346 5/1981 Achelpohl ........................... 156/515

FOREIGN PATENT DOCUMENTS 1930841 7/1969 Fed. Rep. of Germany .
2254448 11/1972 Fed. Rep. of Germany .
1479421 8/1976 Fed. Rep. of Germany .
2940399 10/1979 Fed. Rep. of Germany .

*Primary Examiner*—Caleb Weston
*Attorney, Agent, or Firm*—Fleit, Jacobson, Cohn & Price

[57] ABSTRACT

In a transverse severing apparatus for webs of thermoplastic material, two parallel pressure bars are lowerable onto and raisable from a section or sections to be severed from the web. The upstream pressure bar clamps the leading end of the web to a backing bar. The second pressure bar, which is disposed between a severing knife and the upstream bar, tensions the web clamped between a pair of feed rollers and the upstream pressure bar before the severing knife cuts the web.

4 Claims, 4 Drawing Figures

TRANSVERSE SEVERING APPARATUS FOR WEBS

The invention relates to a transverse severing apparatus for webs of thermoplastic material, preferably tubular webs in the production of bags, comprising a pair of feed rollers cyclically advancing the web by one length of web section, a heated transverse severing knife and backing bar preferably disposed parallel to a transverse welding device, and a pressure bar lowerable onto the severed section or sections.

In apparatuses of this kind known for example from DE-OS 22 54 448 and 29 40 399 and DE-AS 19 30 841, the leading end of a tubular web is advanced in a taut condition by air jets produced by air nozzles on both sides of the web. By lowering a transverse welding bar and a transverse severing knife, the leading web section forming a respective bag is severed and a weld seam is applied to the leading end of the web adjacent the severing cut, this seam forming the base seam of the bag severed during the next following cycle. Since the transverse cutting knives likewise become heated because of their vicinity to the heated welding bar, it is possible in the case of cutting several plies of foils, for example a tubular web, for the web layers to become unified at the cutting zone. This is particularly undesirable if the cut is intended to form the mouth of a bag. Further, the severed edges of the web could ahere to the severing knife and result in disruption of operation.

It is therefore the problem of the invention to improve an apparatus of the aforementioned kind so that the cut edges of multilayer webs, for example tubular webs, cannot become unified through the action of the severing cut and adhesion of the severed edges to the severing knife is avoided.

According to the invention, this problem is solved in that two parallel pressure bars lowerable onto and raisable from the severed section or sections are provided, of which the upstream bar clamps the web end that has been fed between the severing knife and backing bar to a support in a plane lower than the backing bar, and the pressure bar disposed between the severing knife and upstream pressure bar tensions the web clamped between the pair of feed rollers and the upstream pressure bar before the heated severing knife cuts the web. Thus, after the web fed by the pair of feed rollers has been advanced, for example by an air jet, between the opened welding and severing means, the first pressure bar first of all descends so that the web section on which transverse welding and transverse severing is being performed is stretched between the pair of feed rollers and the pressure bar. If, now, the second pressure bar is lowered closely in front of the backing bar, the web will be elastically stretched because the backing bar will form a step with the lower plane in which the leading web end is being clamped. If, now, the elastically stretched web is provided with a transverse cut by the heated knife, the severed edges will spring away from the heated knife.

If the web is a tubular web in the production of bags, the upper layer of the web will first be released from the severing knife and then the lower layer. Thus, since the severed edges of a multilayer web will be released from the severing knife successively, they will also move relatively to each other and pulled apart whereby adhesion or unification of the severed edges is avoided.

If the web sections or bags are stacked after the severing cut, such elastic stretching will also ensure that the trailing ends of the bags or sections are smoothly applied to the stack being formed.

In a further embodiment of the invention, the pressure bar stretching the web after it is clamped can also perform the function of a pusher member which threads the severed edges onto a row of needles for the purpose of locating same.

Other advantages embodiments of the invention have been described in the subsidiary claims.

One example of the invention will now be described in more detail with reference to the drawing, wherein.

Figure 1:
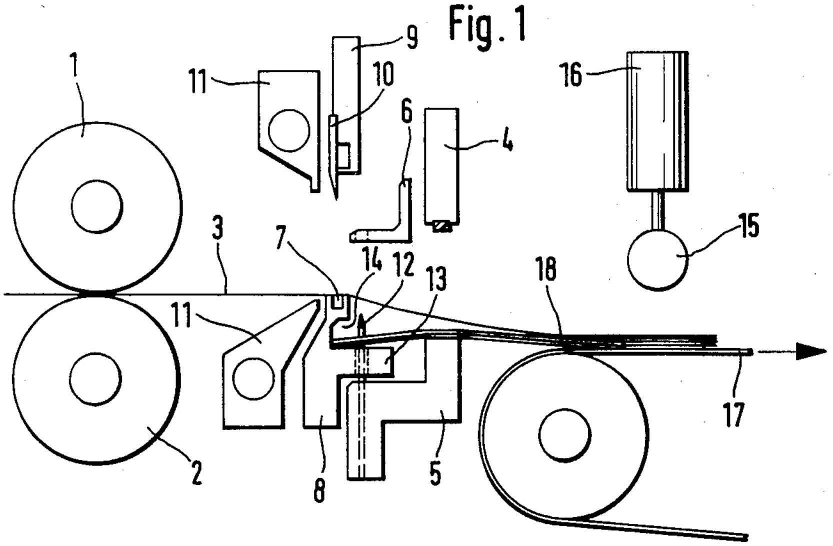
FIG. 1 is a diagrammatic side elevation of the transverse welding and transverse severing device.

In the illustrated apparatus, the feed rollers 1 and 2 cyclically advance the tubular plastics web 3 by one bag length at a time and clamp it tight between each other. For the purpose of advancing the leading web end in a taut condition, air nozzles (not shown) may be provided. If, now, a sufficiently long tubular web section has been advanced through the feed rollers 1 and 2, the depresser consisting of the pressure bar 4 first descends onto a backing member so that the web is clamped between the feed rollers 1, 2 on the one hand and the pressure bar 4 and the backing member 5 on the other hand, as is shown in FIG. 2. Immediately thereafter, the pressure bar 6 moves from the position shown in FIG. 1 to that in FIG. 2 and pushes the web so far downwardly that the web is placed under tension over the groove 7 of the backing bar 8. The web 3 is then severed by lowering the upper severing knife holder 9 with the transverse cutting knife 10 secured thereto. Simultaneously or immediately thereafter, the base seam is formed by the permanently heated pair of welding jaws 11.

Figure 3:
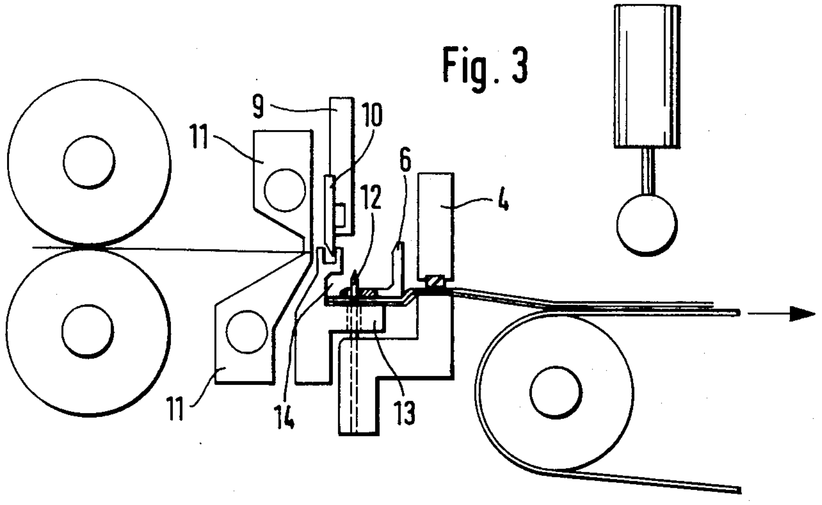
FIG. 3 shows the FIG. 1 apparatus with the mouths of the bags threaded onto the row of needles.
Figure 4:
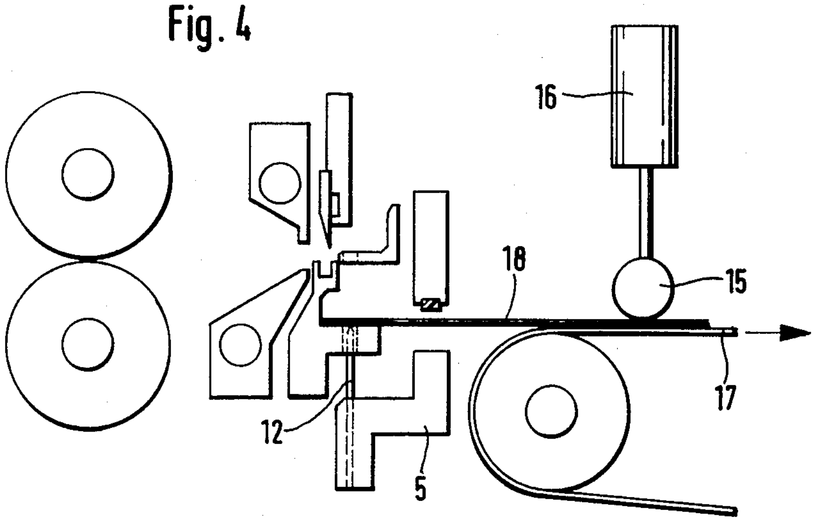
FIG. 4 shows the FIG. 1 apparatus upon commencement of taking the finished stack away after the row of needles has been retracted.

Immediately after severing, the pressure bar 6 moves to the FIG. 3 position and thereby presses the severed bag onto the supporting bar 13 connected to the backing bar 8. During this step in the process, the welding jaws 11 are still closed and the transverse weld seam is formed. The supporting bar 13 has holes through which the needles 12 project upwardly so that the severed bag is at the same time spiked. The needles 12 are securely connected to the flanged section of the backing member 5.

The pressure bar 6 also has holes so that the individual bags can be pushed onto the needles 12 against the supporting bar 13. The recess 14 beneath the groove 7 in the backing bar 8 ensures that the bag edges are deposited without buckling.

Figure 2:
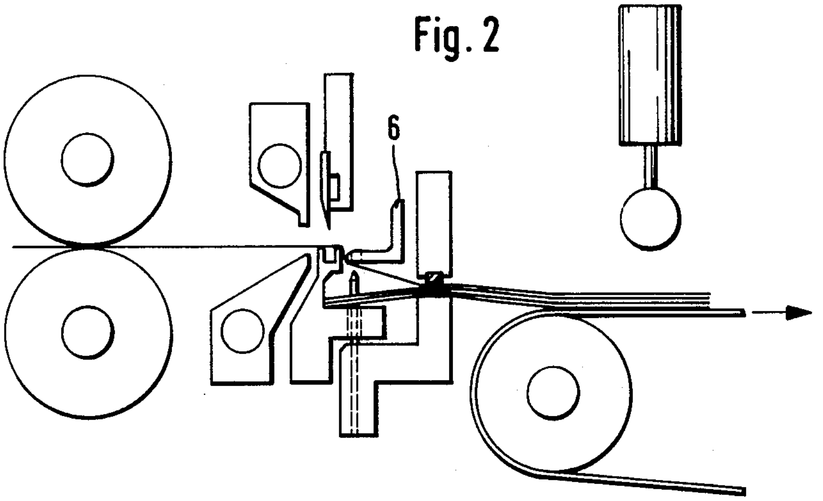
FIG. 2 shows the FIG. 1 apparatus in a condition in which the web section clamped between the feed rollers and a pressure bar is tensioned by a further pressure bar before the severing cut.

The individual components will then move from the FIG. 3 position back to the position shown in FIG. 1 so that the web 3 can then be advanced by one further section length by the feed rollers 1, 2, possibly with the aid of air nozzles. As soon as sufficient bags have been stacked, the backing member 5 moves downwardly and the needles 12 pull out of the stack of bags. When this has happened, the tipper roller 15 controlled by the piston-cylinder unit 16 descends onto the conveyor belt 17 which is then switched on to take the finished stack 18 away.

I claim:

1. A transverse severing apparatus for an advancing web of thermoplastic material, said apparatus comprising:

- a feeding means for cyclically advancing the web along a path;
- a heated severing knife;
- a backing bar positioned on the opposite side of the web from the severing knife cooperating with the severing knife;
- a web welding means positioned adjacent to the heated severing knife and the backing bar;
- a first pressure bar spaced from the heated severing knife and the backing bar for tensioning the web across the backing bar;
- a second pressure bar positioned adjacent to the severing knife and the backing bar on the opposite side of the web welding means, said second pressure bar being movable to a plane spaced from the plane of the web passing between the severing knife and the backing bar for elastically stretching the tensioned web positioned across the backing bar in advance of the web being cut by the severing knife and being welded by the web welding means; and
- a recess provided below a top surface of the backing bar for receiving cut web and for preventing the cut web from buckling.

2. Apparatus according to claim 1, wherein the second pressure bar tensioning the web is spaced from a row of needles arranged on a needle carrier for receiving the cut web.

3. Apparatus according to claim 2, wherein the needle carrier is movable and the needles are adapted to pass through a depositing bar connected to the backing bar.

4. Apparatus according to claim 1, wherein the backing bar defines a groove for receiving the severing knife.

* * * * *